J. LOHRMANN.
WATER PURIFIER.
APPLICATION FILED MAY 9, 1911.
1,063,047.
Patented May 27, 1913.
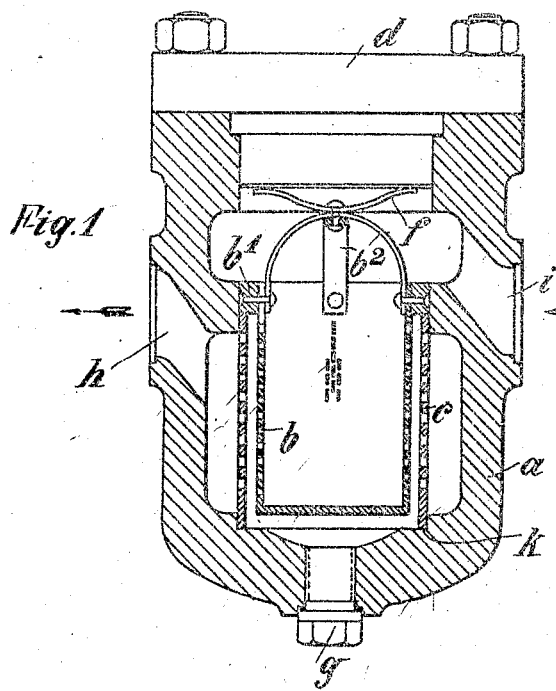
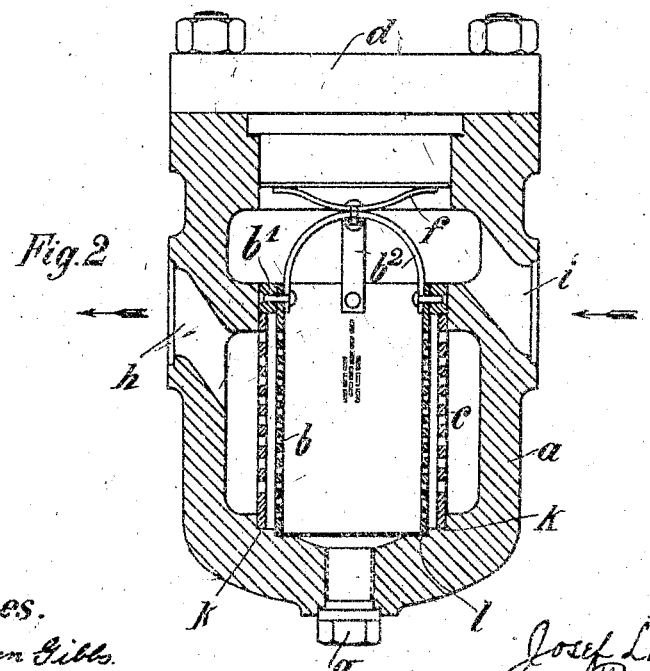
Witnesses.
A. Worden Gibbs.
Sally G. Yudizky.
Inventor
Josef Lohrmann
By Fredk F. Schuck
Attorney

UNITED STATES PATENT OFFICE.

JOSEF LOHRMANN, OF DUSSELDORF, GERMANY.

WATER-PURIFIER.

1,063,047.

Specification of Letters Patent.  Patented May 27, 1913.

Application filed May 9, 1911.  Serial No. 625,976.

*To all whom it may concern:*

Be it known that I, JOSEF LOHRMANN, a citizen of the German Empire, and resident of Dusseldorf, Germany, have invented certain new and useful Improvements in Water-Purifiers, of which the following is a specification.

My invention relates to improvements in water purifiers of the class which is used in high-pressure and low-pressure water-conduits and the object of my invention is to provide an improved device of the class referred to which is of plain construction, permits an easy and convenient cleaning and shows certain other advantages hereinbelow specified.

In describing my invention I refer to the drawing herewith in which—

Figure 1 is a vertical transverse section through my improved purifier while Fig. 2 shows a similar device, also in vertical cross-section, slightly modified, but within the spirit and scope of my invention.

My new water purifier comprises a vessel $a$ adapted for insertion in and communication with or attachment to a main or other conduit pipe. It contains a plurality of strainers of cylindrical or other suitable shape which are so disposed within the said vessel that the water is forced to pass through one and then the other, or others, to separate any impurities, as sand, mud or the like. In the drawing two strainers, one within the other, are shown in each figure, the innermost strainer being marked $b$ and the one inclosing it $c$. The strainers may be made of perforated sheet-metal, preferably copper or brass, the whole passage of the perforations in each strainer being larger than that of the conduit-pipe. The main office of the strainer $c$, or strainers, inclosing the innermost strainer, is to prevent the water from leaving the vessel $a$ unpurified, in case the inner strainer or strainers or any of them should become spoiled or injured. The outer strainer $c$ may be without bottom and is mounted on a shoulder $k$ provided for the purpose in the bottom of the vessel $a$. The intermediate space between any two strainers may on top be covered by a suitable cover, as a ring $b^1$ or the like and there may be a spring $f$ secured to and acting against the said ring or against an intermediate cross-head $b^2$, or the like, thereabove thus causing the said ring $b^1$ to firmly press and seal the top end of the outer strainer $c$ and at the same time press the bottom-end of the latter against the aforesaid shoulder $k$. In the bottom-end of the vessel $a$ I provide an outlet with a removable seal, as a screw or plug $g$.

The vessel $a$ is provided with lateral outlets, $h$ and $i$, adapted to receive the respective ends of the conduit-pipe. While the said outlets may be in alternate position to each other, I prefer them to be at one level, as shown in both figures on the drawing, because in this case the vessel may be more conveniently adjoined to the water conduit direct without requiring an intermediate knee or elbow piece.

The aforesaid innermost strainer $b$ may have a bottom, as shown in Fig. 1; it may, however, as well be without a bottom and mounted on a shoulder $l$ provided within the vessel $a$ against which it is pressed by the aforesaid spring $f$.

The vessel $a$ is on top closed by a cover $d$ which may be taken off to permit a cleaning of the inner strainer $c$ which may be taken out for the purpose. This will not be necessary, however, if a strainer $b$ without a bottom is used, as in Fig. 2, as in this case it may be conveniently washed out on removing the plug or screw $g$ in the bottom end of the vessel $a$. Moreover, the bottomless strainer is more convenient and less expensive to manufacture.

My improved water purifier is particularly adapted for use in hydraulic machine plants and may with advantage be inserted into the conduit-pipe to the machine.

Within the innermost strainer may be placed lubricant of suitable consistency, whereby the water passing through said strainer will receive some of said lubricant for use beyond the strainer.

Of course, the new water purifier may be used in any other plant.

Claims:—

1. A water purifier comprising: the combination of a vessel having lateral openings adapted to be joined to the conduit pipe of a water conduit, and two strainers, the one within the other, in said vessel; supporting means for the strainers at one end; means at the other end secured to one of said strainers and bearing upon the other to close the space between the said strainers; and resilient means adapted to act on said closing means.

2. A water purifier comprising: the combination of a vessel having lateral openings adapted to be joined to the conduit pipe of a water conduit, and a plurality of cylindrical strainers, the one within the other, in said vessel; suitable strainer supporting means; a ring secured to the top of one of said strainers bearing upon the other and closing the space between the same; and a spring above said ring adapted to act thereon.

3. A water purifier of the class referred to comprising the combination of a vessel having side openings adapted to be joined to the conduit pipe of a water conduit, the said openings being at one level, and of bottomless cylindrical strainers within the said vessel, the said vessel having shoulders inside of its bottom adapted to support the said strainers, a ring on top of the said strainers covering the intermediate space between the latter and a spring above the said ring, the said ring and strainers being within the action of the said spring and the said vessel having further an opening in its bottom and a removable seal in the said opening.

In testimony whereof I have hereunto signed my name to this specification in the presence of two subscribing witnesses.

JOSEF LOHRMANN. [L. S.]

Witnesses:
   CHAS. J. WRIGHT,
   ALFRED HENKEL.